US006997022B1

(12) United States Patent
DeMange

(10) Patent No.: US 6,997,022 B1
(45) Date of Patent: Feb. 14, 2006

(54) WHEEL LOCK FOR A TRAILER

(76) Inventor: Craig DeMange, 1031 Logan Blvd., Naples, FL (US) 34116

( * ) Notice: Subject to any disclaimer, the term of this patent is extended or adjusted under 35 U.S.C. 154(b) by 0 days.

(21) Appl. No.: 11/032,066

(22) Filed: Jan. 10, 2005

(51) Int. Cl.
B60R 25/00 (2006.01)

(52) U.S. Cl. .......................................... 70/19; 70/226

(58) Field of Classification Search .................. 70/19, 70/225, 226, 14, 18, 209, 259, 260
See application file for complete search history.

(56) References Cited

U.S. PATENT DOCUMENTS

| | | | | |
|---|---|---|---|---|
| 3,695,071 A | * | 10/1972 | West ............................ | 70/225 |
| 4,649,724 A | * | 3/1987 | Raine ........................... | 70/226 |
| 4,651,849 A | * | 3/1987 | Givati ......................... | 180/287 |
| 4,819,462 A | * | 4/1989 | Apsell ........................... | 70/14 |
| 4,854,144 A | * | 8/1989 | Davis ........................... | 70/226 |
| 5,137,121 A | * | 8/1992 | Leonard ...................... | 188/32 |
| 5,214,944 A | * | 6/1993 | Wolthoff ...................... | 70/226 |
| 5,263,553 A | * | 11/1993 | Duncan ........................ | 188/32 |
| 5,333,477 A | * | 8/1994 | Davis ........................... | 70/226 |
| 5,419,165 A | * | 5/1995 | Perkins ......................... | 70/14 |
| 5,437,171 A | * | 8/1995 | Owen ........................... | 70/14 |
| 5,706,682 A | * | 1/1998 | Barker et al. ................ | 70/226 |
| 5,787,742 A | * | 8/1998 | Lewis et al. .................. | 70/209 |
| 5,865,048 A | * | 2/1999 | Beavers et al. ................ | 70/18 |
| 5,927,108 A | * | 7/1999 | Pierce ........................... | 70/19 |
| 6,662,607 B1 | * | 12/2003 | O'Neal ......................... | 70/226 |

* cited by examiner

Primary Examiner—Lloyd A. Gall

(57) ABSTRACT

A locking assembly is being used on a trailer and is installed on at least one wheel. The locking assembly consists of two locking bars that have U-shaped ends at an outer end and straight sections at an inner end. Each of the inner ends have a multiple of bores there through. When installed, the inner ends of the locking bars are received in a receiver box, which is attached to a cylindrical hub, in an overlapping relationship whereby any of the bores will align with each other. A locking pin is passed through the bores once the locking bars are in place and once the U-shaped ends are placed around a tire and properly matched with its size.

4 Claims, 3 Drawing Sheets

WHEEL LOCK FOR A TRAILER

BACKGROUND OF THE INVENTION

The inventive concept is directed to a wheel lock for a trailer. Just about all trailers for carrying a boat, for example, have only one axle and very few have two axles. This invention is also directed to house trailers which also do not have any way of locking the wheels in place. The inventive concept results in that trailers cannot be moved without the owner's permission. It is a known fact that many trailers are moved without the owner's consent that is, they are hitched up by unauthorized users. With the wheels locked in place this cannot happen.

The only known prior art is used in law enforcement through the use of the wheel locks known under the name of "boots". These boots are used to disable vehicles from being driven when parked in overtime by scofflaws. However, these boots use an entire different system than what is disclosed by the applicant.

BRIEF DESCRIPTION OF THE INVENTION

The inventive wheel lock consists of U-shaped bars that substantially surrounds the tire of the trailer, it is preventing the wheel from being rotated because it locked against rotation by locking into the spring blades of the trailer and the wheel cannot be removed because the lug nuts are hidden behind a plate when the wheel lock is in place.

DETAILED DESCRIPTION OF THE INVENTION

Figure 1:
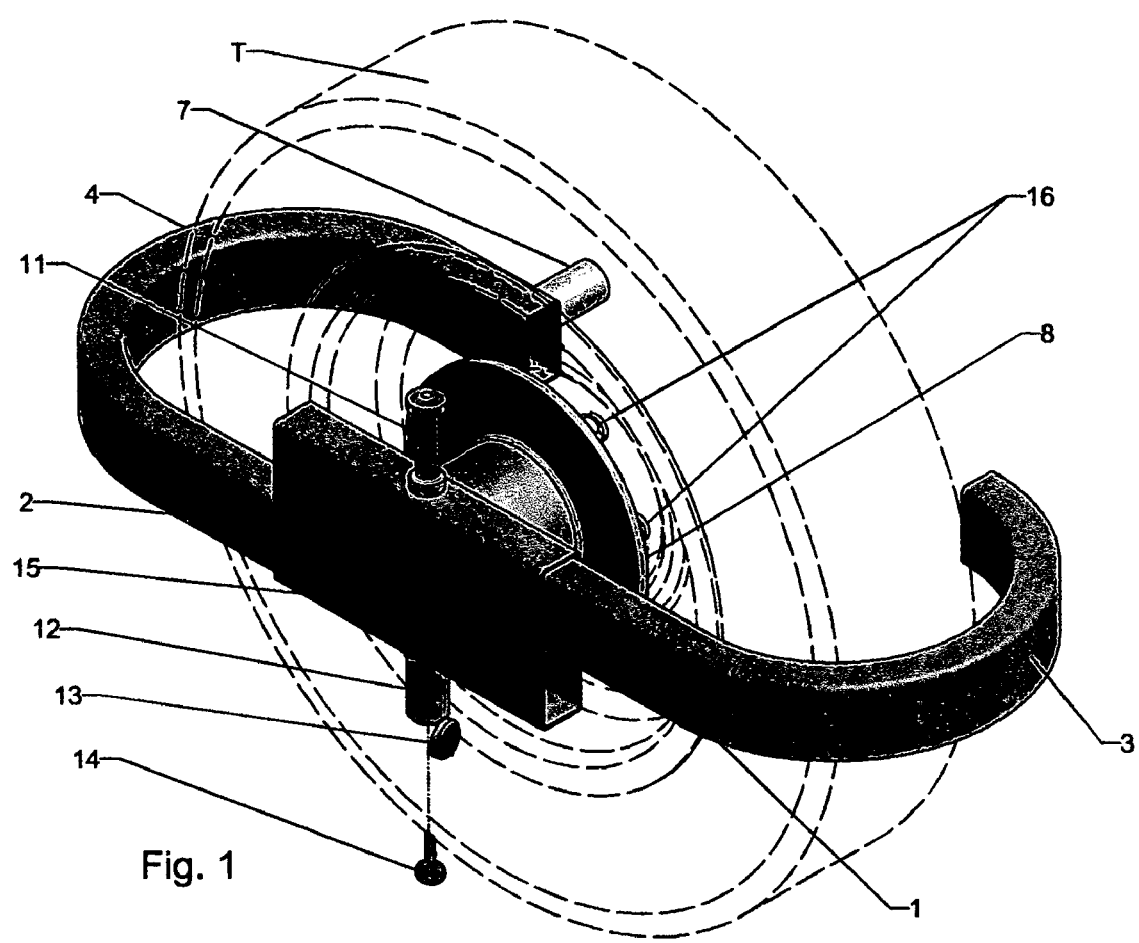
FIG. 1 is a perspective view of the wheel lock installed on a wheel.

FIG. 1 illustrates a perspective view of the wheel lock as it is installed on a trailer wheel. There are locking bars 1 and 2 which are made of steel and are of a square configuration for strength and stability and they have U-shaped ends 3 and 4 which will embrace the tire T of the wheel when set in place. As can be seen in the drawings, the locking bars extend in a linear direction relative to each other. One of the U-shaped ends, 3 in this case, has a rearward pointing pin 7 thereon which will slip between the blades of the spring assembly of the trailer to prevent a rotation of the wheel when it is jacked up. The straight ends of each of the locking bars have several bores 5 and 6 (FIGS. 3–6) there through. These bores will receive a locking bolt 11 therein when the locking bars are in an overlapping position. The locking bars 1 and 2 are received in a receiver box 15 where they are in an overlapped position depending on the size of the tire T. The ends of the locking bars 1 and 2 are in U-shaped configuration to embrace the tire T. The receiver box 15 has a hub 9 (FIG. 2) thereon which faces inwardly toward the wheel. The hub 9 carries a circular disc 8 which is large enough to encircle the circle of the lug nuts 16 of the wheel. This circular disc has the important function to cover the lug nuts 16 when the wheel lock is installed whereby the wheel lock nuts are inaccessible and cannot be removed. The locking bolt 11 is passed through the locking bars 1 and 2 and a lock cylinder 12 is received at the other end. Once the key 14 has been removed, the locking bolt 11 cannot be removed. The lock cylinder receives a cap 13 to prevent moisture or dirt from entering into the lock cylinder 12.

Figure 2:
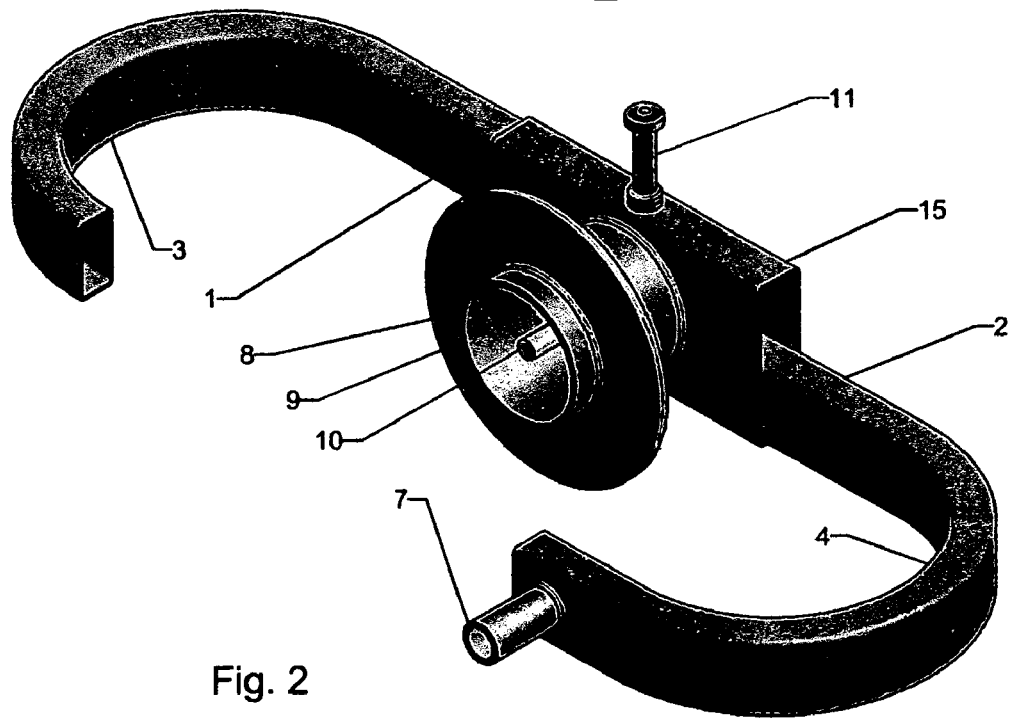
FIG. 2 illustrates the wheel lock by itself in an assembled position.

FIG. 2 shows the wheel lock without the tire but in a reverse position. The same reference characters have been applied as were with regard to FIG. 1. At 10 is shown a pin which is mounted within the hub 9 but in a central position.

Figure 3:
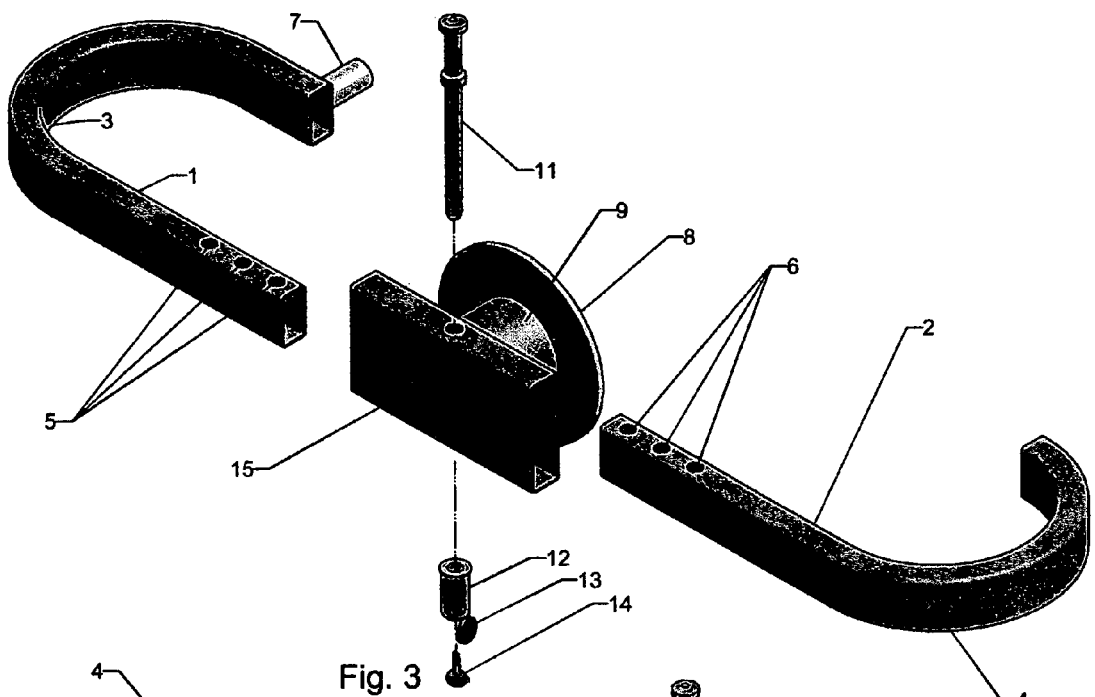
FIG. 3 shows the wheel lock in a disassembled position seen from the front.

FIG. 3 shows the wheel lock in a disassembled layout just prior to being fastened to a wheel. The reason why there are several bores 5 and 6 through the locking bars 1 and 2 and at the ends thereof is that when the locking bars are overlapped and located around the tire, is to be able to adjust the locking bars 1 and 2 to different size tires. FIG. 3 also shows the hub 9 which carries the receiver box 15 which will receive the ends of the locking bars 1 and 2 in an overlapping and in an up and down relationship.

Figure 4:
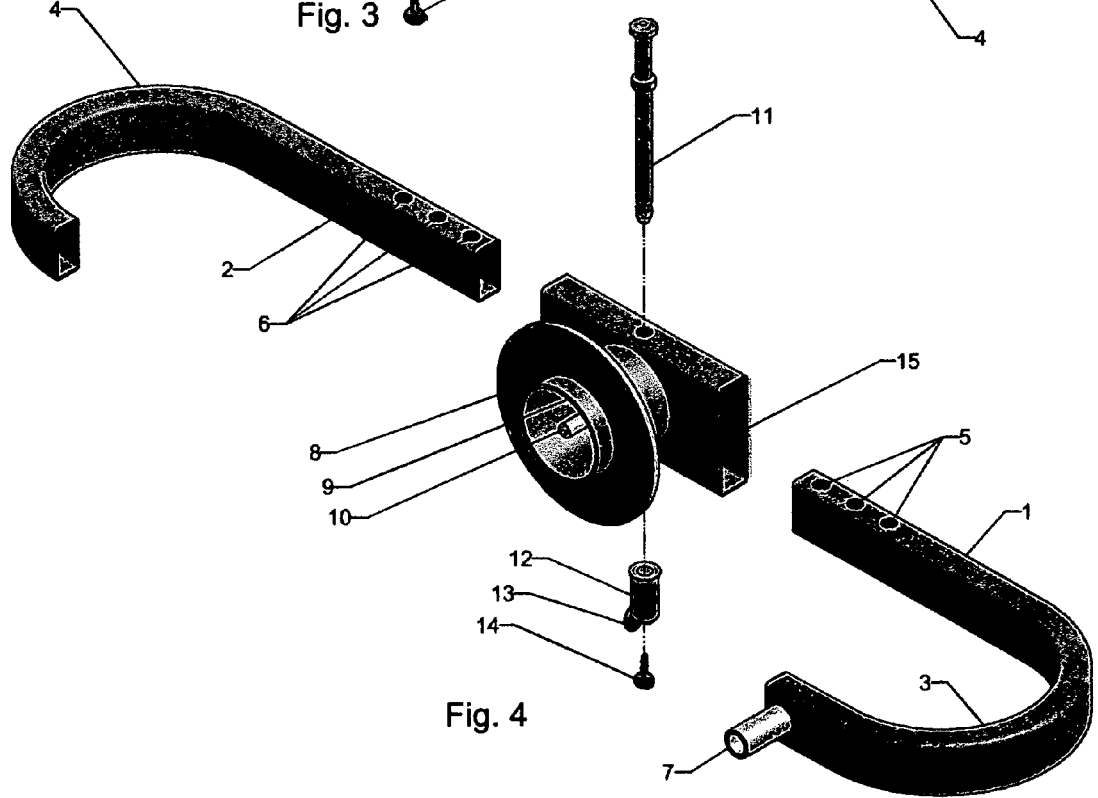
FIG. 4 shows the wheel lock of FIG. 3 in a rear view.

FIG. 4 is a perspective view of the wheel lock of FIG. 3 but in a reverse showing. The same reference characters are being used as were in previous Figs. which can only removed by way of a key once it is locked. At 13 is shown a cylinder cover cap which is snap-fitted over the locking cylinder.

Figure 5:
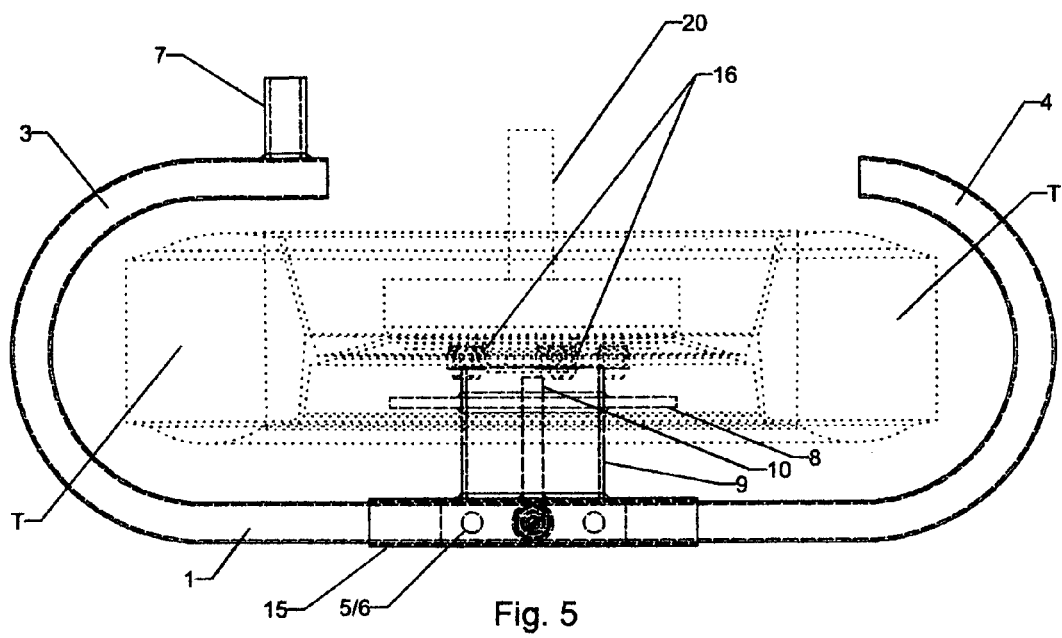
FIG. 5 shows the wheel lock as seen from the top.

FIG. 5 is a top view of the wheel lock in an assembled condition with the phantom of tire T shown in a top view. The same reference characters have been applied as were in previous Figs. This FIG. 5 shows the lineup of the bores 5/6 to a proper size of the tire T. At 20 is shown the axle of the trailer to which the wheel is mounted.

Figure 6:
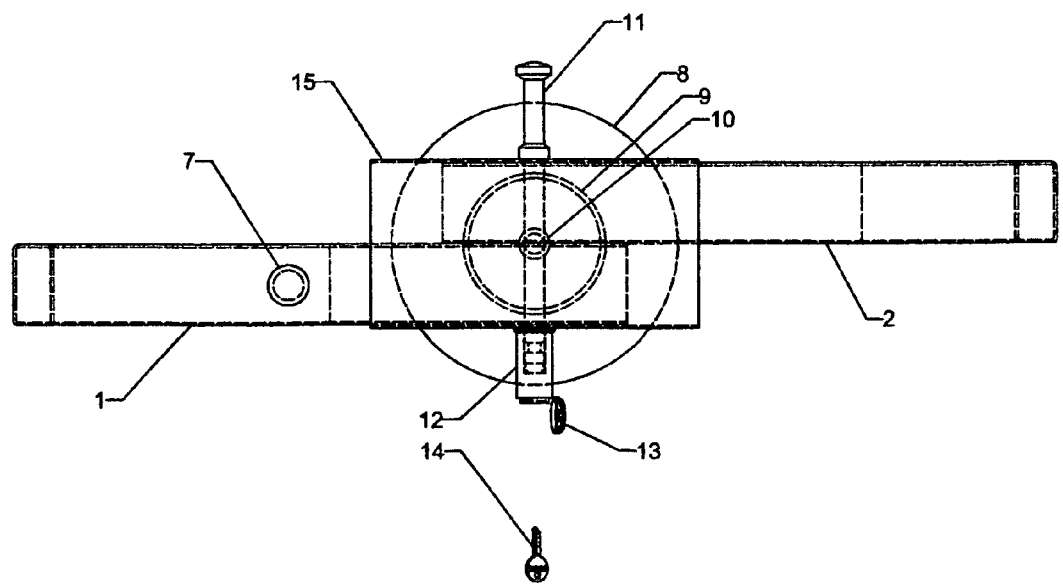
FIG. 6 shows the wheel lock as seen from the front.

FIG. 6 is a frontal view of the locking bars 1 and 2 in an overlapped and up and down position. Again, this FIG. 6 shows the same references characters of previous Figs.

What is claimed is:

1. A trailer wheel locking assembly comprising two locking bars having U-shaped ends at outer ends thereof and are adapted to surround a tire on said wheel and straight sections at inner ends, each of said straight sections being aligned in a linear direction relative to each other, each of said straight sections having a multiple of bores there through, a cylindrical hub having a receiver box attached thereto, said inner ends of said locking bars are being received in said receiver box in an overlapping relationship, a bore in one of said locking bars will align with a bore in the other of the locking bars, a locking pin is passed through said bores and a locking cylinder is installed over an end of said locking pin.

2. The locking assembly of claim 1, wherein rotation preventing pin is extending from one of said U-shaped ends in a direction toward said wheel to slip between blades of a spring assembly of said trailer to arrest said wheel from being rotated.

3. The locking assembly of claim 1 including a cylindrical disc being attached to said hub, said disc being of a size to prevent lug nuts on said wheel from being removed from said wheel.

4. The locking assembly of claim 1, wherein said locking bars are made of stainless steel and are of a square cross-section.

\* \* \* \* \*